Oct. 8, 1940.    A. G. HOUPT    2,217,515
CONVERSION OF RICINOLEATES INTO OTHER ORGANIC COMPOUNDS
Filed Feb. 8, 1939
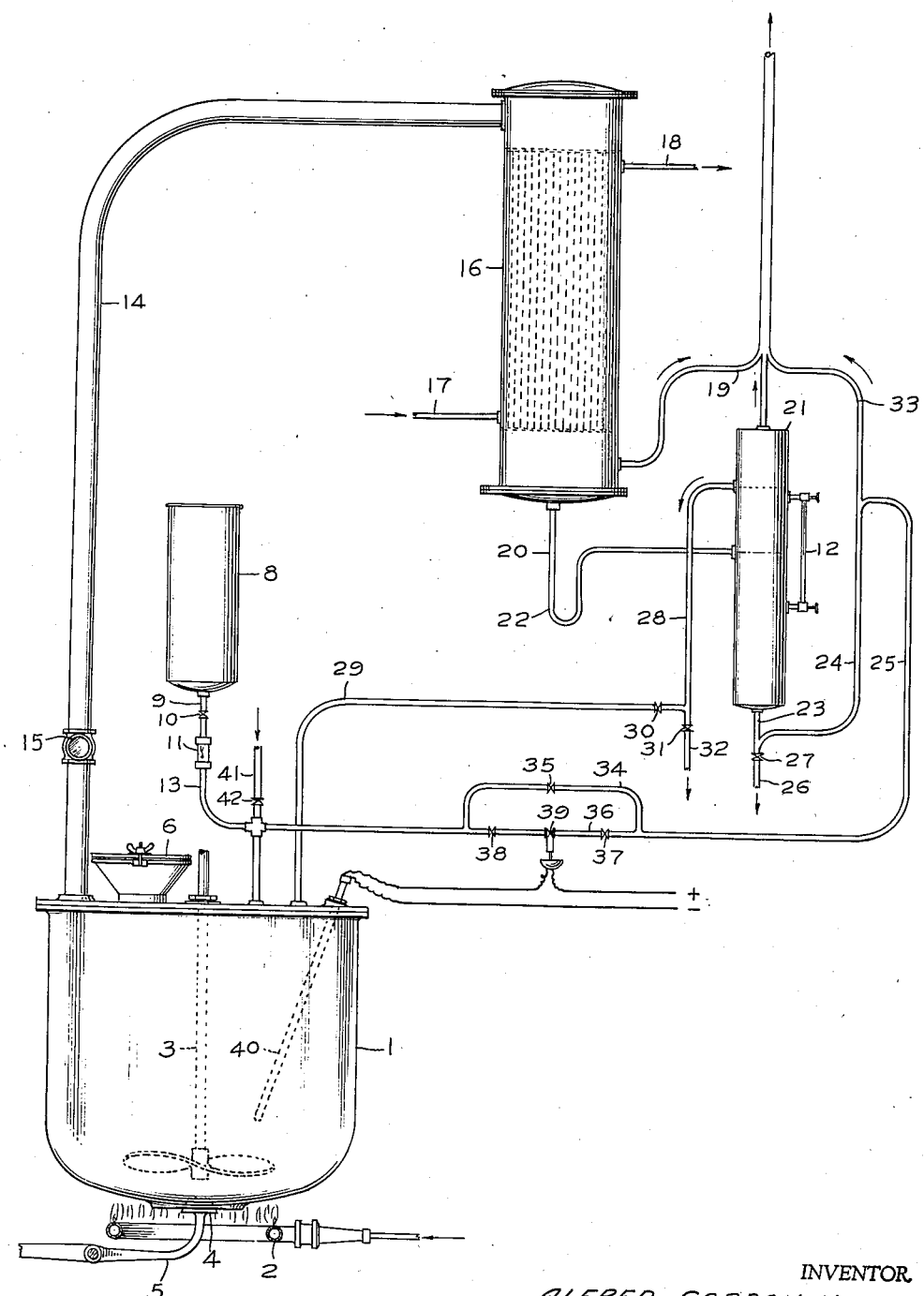
INVENTOR.
ALFRED GORDON HOUPT,
BY
His ATTORNEY.

UNITED STATES PATENT OFFICE 2,217,515

CONVERSION OF RICINOLEATES INTO OTHER ORGANIC COMPOUNDS

Alfred Gordon Houpt, Stamford, Conn., assignor to American Cyanamid Company, New York, N. Y., a corporation of Maine Application February 8, 1939, Serial No. 255,176

12 Claims. (Cl. 260—418)

This invention relates to the conversion of a ricinoleate such as castor oil into other organic compounds such as omega-hydroxydecanoic acid, salts of omega-hydroxydecanoic acid, sebacic acid, salts of sebacic acid, methyl hexyl ketone, capryl alcohol, or various mixtures thereof.

It has been suggested that omega-hydroxydecanoic acid be produced by a complicated process using relatively expensive raw materials but this is obviously not suitable for commercial practice. Capryl alcohol and sebacic acid have previously been prepared to some extent from castor oil but attempts at production of these compounds on a commercial scale have been generally unsatisfactory because of the many practical difficulties involved. Thus, castor oil has been saponified with caustic and the resulting soap has been subjected to distillation in the presence of caustic and water. However, during the distillation process, great difficulty was experienced because of the excessive foaming of the soap which usually resulted in the soap overflowing from the apparatus or else clogging the system. Another difficulty encountered was the control of the temperature at which the distillation was carried out. If the distillation temperature is not carefully controlled, poor yields of the desired products may be obtained, and, furthermore, the undesired foaming is more likely to occur.

It is one object of this invention to produce omega-hydroxydecanoic acid or its salts from a ricinoleate.

Another object of this invention is to devise a process for converting ricinoleates into sebacic acid, omega-hydroxydecanoic acid, capryl alcohol, methyl hexyl ketone, or various mixtures thereof, which process is economical and practical and which can, therefore, be used commercially. Still another object of this invention is to control the rate of reaction in the process and to control the temperature at which the reaction is carried out in order to overcome difficulties of the prior art.

These and other objects are attained by suitably converting a ricinoleate in the presence of caustic and water at an appropriate reaction temperature. When a ricinoleate is heated with caustic alkali and water, the resulting products will usually be determined by the temperature at which the reaction is carried out.

In order to overcome the difficulties of the prior art, it is desirable that the ricinoleate be added to an aqueous composition including caustic alkali slowly while the reaction mixture is heated sufficiently to maintain a suitable reaction temperature. Furthermore, the reaction temperature should preferably be kept substantially constant.

Salts of ricinoleic acid or substances which upon saponification yield salts of ricinoleic acid are suitable for reaction according to my invention. Among these compounds are ricinoleic acid (hydrogen ricinoleate) triricinolein (glycerol ricinoleate, the principal ingredient of castor oil), ricinoleic acid esters of other alcohols, and ricinoleic acid amides. All of these compounds, as well as the salts of ricinoleic acid, contain the ricinoleic acid radical

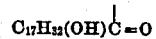

$$C_{17}H_{32}(OH)\overset{|}{C}=O$$

For convenience, the term "ricinoleate" will be used to designate all of these substances as well as the raw materials, such as castor oil, which contain these substances. While the ricinoleates are usually derived from castor oil, other sources could also be used such as ivory wood seed oil, grape seed oil, quince oil, etc.

Although the process may be conducted in any suitable apparatus, either as a continuous or batch process, the apparatus shown in the accompanying drawing has been found to be particularly suitable. The drawing shows somewhat diagrammatically the apparatus, partly in section and partly in elevation.

A suitable reaction chamber such as the kettle 1 is heated by a burner 2. The kettle is fitted with a suitable stirrer 3 and contains a discharge outlet 4 with a drop out valve 5. The top of the kettle 1 contains a charging port 6.

A supply tank 8 for the ricinoleate has an outlet conduit 9 which is provided with a suitable valve 10 for controlling the flow of the ricinoleate. Conduit 9 connects with conduit 13 through a sight glass 11 and conduit 13 is also connected to the kettle 1.

The top of the kettle 1 also has an outlet conduit 14 attached thereto and this conduit may contain a sight glass 15. The conduit 14 is connected to a condenser 16. Cooling water may be circulated through the condenser by means of inlet 17 and outlet 18. The condenser 16 also has a vent 19 and a condensate outlet 20 which feeds into a separator 21 through a goose-neck 22. The separator 21 contains an outlet 23 at the bottom which connects with a standpipe formed by conduits 24 and 25. The outlet 23 from the separator 21 also contains a suitable draw-off line 26 provided with valve 27. The separator may be provided with a sight glass 12 and has a draw-off pipe 28 near the top at a point somewhat higher than the top of the standpipe.

The draw-off pipe 28 connects with conduit 29 which connects with kettle 1 and is provided with a valve 30. Conduit 28 is provided with valve 31 located at a point beyond the connection of conduit 30. Conduit 28 connects with conduit 32 and the latter connects with a suitable storage, or alternatively, further processing apparatus (not shown). A vent 33 is connected to the top of the separator 21 and to the top of the standpipe formed by conduits 24 and 25, and this vent may be connected with vent 19. The conduit 25 connects with by-pass conduit 34 which contains a valve 35. Conduit 25 also connects with conduit 36 containing valves 37 and 38 and an electrically actuated valve 39 located between valves 37 and 38. Conduit 36 and conduit 34 are connected to the kettle 1. The electrically actuated valve 39 is operated by any suitable well known means and its operation is controlled by thermostatic element 40. Water may be supplied to the kettle 1 directly through a conduit 41 which is provided with a valve 42.

In operation, a mixture of caustic and water is charged into the kettle 1 and heated to a suitable reaction temperature. The agitator 3 is placed in operation, the valve 35 is opened slightly, and the thermostatic control and valve 39 are placed in operation. The castor oil from tank 8 is then fed slowly into the kettle 1 at such a rate that no foaming is visible in the sight glass 15. The volatile reaction products distill off along with some water and pass up through conduit 14, into the condenser 16. The condensate from the condenser 16 flows through conduit 20 into the separator 21 where it separates into an essentially aqueous fraction and an essentially non-aqueous fraction. The essentially aqueous fraction of the condensate is usually returned to the kettle through the conduit system formed by elements 23, 24, 25, 34 and 36. A continuous stream of the essentially aqueous fraction of the condensate is permitted to flow back into the kettle 1 through by-pass conduit 34 and its rate is adjusted by means of the valve 35. A part of the essentially aqueous fraction of the condensate is permitted to flow through the valve 39 whenever the temperature in the kettle rises above the desired temperature for which the thermostatic control has been set. The essentially non-aqueous fraction of the condensate is usually drawn off through conduit 28 and its flow into conduit 32 is controlled by valve 31. The non-aqueous fraction of the condensate flows through conduit 32 to a suitable storage or to other processing apparatus (not shown). Alternatively, at least part of the essentially non-aqueous fraction of the condensate may be permitted to flow back to the kettle 1 through conduit 29 by opening valve 30.

The hydrogen which may be formed during the reaction escapes through the vent 19.

The following is a description of one method of carrying out my process to convert a ricinoleate into other organic compounds. Specifically, the example describes the conversion of castor oil into omega-hydroxydecanoic acid, methyl hexyl ketone and a minor proportion of capryl alcohol. This example is merely illustrative of my process, it being understood that my invention is not restricted to the specific details and procedure set forth. The process may be conducted in the apparatus and in the manner generally described above, but any other suitable apparatus may be substituted.

400 parts by weight of water, 1000 parts by weight of caustic soda, and 200 parts by weight of 600-W lubricating oil (to act as an anti-foam) are charged into the kettle 1. The 600-W oil is one having an initial boiling point at atmospheric pressures of about 700° to 750° F. and a flash point of about 540° F. The contents of the kettle are then heated to about 190° C. and the water distilling from the reaction mixture is allowed to run back from the condenser 16 and separator 21 into the kettle 1 at about the same rate at which it is distilled in order to maintain the temperature substantially constant. 1000 parts by weight of castor oil are added slowly over a period of about an hour. The temperature is maintained at about 190° C. for a total of about three hours, during which time an oily layer collects in the separator 21 which is drawn off from time to time. The contents of the kettle 1 are preferably discharged and then allowed to cool to about room temperature when they are mixed with about 8000 parts by weight of warm water and agitated at about 80° to 90° C. until the mixture is uniformly dispersed. This dispersion is treated with sulfuric acid (preferably about 50% concentration) until the pH is reduced to between about 5.5 and 7.0, preferably about 6.7. The dispersion is allowed to stand for about an hour at 80° to 90° C., during which time an oily layer collects on the surface. The lower aqueous layer is separated from the oily layer and is clarified of suspended oil by agitation with about 200 parts by weight of kieselguhr and 100 parts by weight of decolorizing carbon such as "Darco" for about twenty minutes at about 60° to 65° C., followed by filtration.

The clear, colorless filtrate is acidified to a pH between about 1.5 and 2 with sulfuric acid (preferably about 50% concentration). Upon cooling, omega-hydroxydecanoic acid separates as snow-white globules. It is filtered off and washed with cold water until the washings give no test for sulfate ion. It is then transferred to a vacuum oven and dried to constant weight at 55° to 60° C.

Other mineral acids, e. g. hydrochloric, nitric etc. could be substituted for the sulfuric acid as used above.

The product is a snow-white, free-flowing crystalline powder with a yield of about one third of the castor oil used. The product is about 98% omega-hydroxydecanoic acid and has a melting point of about 70° to 74° C., and has a neutral equivalent of about 188.8

The oily mixture which distills over and which is separated from the water in the separator 21 is preferably redistilled and the fraction boiling between about 172.5° and 175° C. is collected. Analysis shows that this oily mixture contains methyl hexyl ketone and usually less than about 12% of capryl alcohol. The oil is treated with sodium bisulfite, thereby yielding an insoluble complex with the ketone and this complex is washed free of capryl alcohol with a low boiling solvent, e. g. methanol, ethanol, etc. The insoluble complex is then steam distilled in order to recover the ketone, leaving the bisulfite in the still. If the bisulfite is not to be recovered, the insoluble complex may be treated with either an acid or a base in order to speed up the reconversion to the ketone on steam distillation. The ketone which is recovered has a boiling range between about 172.5° F. and about 173.5° C.

When temperatures somewhat higher than 205° C. are used in the treatment of a ricinoleate, a mixture of salts of sebacic acid and omega-hydroxydecanoic acid may be produced. In this event, the mixed acids are recovered from the reaction mixture in the same way as described above for the recovery of the omega-hydroxydecanoic acid and the two acids may be separated from each other by extracting the sebacic acid from the mixed acids with hot water. Another way of effecting the separation is by separating the two acid salts by precipitating the dialkali salts of the sebacic acid from alcohol in which the omega-hydroxydecanoic acid salts are soluble.

The reaction products which are obtained are controlled primarily by the temperature at which the reaction of the ricinoleate is carried out. If it be desirable to obtain sebacic acid, the reaction temperature should be preferably between about 235° and 275° C. In this range of temperature, capryl alcohol will normally be produced also. On the other hand, if omega-hydroxydecanoic acid be desired, the temperature should be between about 180° and 230° C. When operating within this range of temperature, methyl hexyl ketone will normally be the principal by-product. In order to produce a pure omega-hydroxydecanoic acid, it is desirable to operate the process in the lower range of temperature, e. g., 190° to 205° C. Obviously, various mixtures of these reaction products may be obtained when the reaction is conducted at temperatures between about 205° and about 235° C. Lower reaction temperatures may also be used, e. g. as low as about 150° C., but the reaction will generally proceed too slowly for economical operation. Higher temperatures than 275° C., up to the temperature at which carbonization begins e. g. up to 350° to 400° C., may also be used, but usually it is more convenient to operate the process within the preferred ranges of temperature mentioned above.

The caustic alkali which is used may be either sodium hydroxide, potassium hydroxide, or mixtures of the two. By the use of mixtures, compositions are obtained which have lower softening points and/or are more fluid than compositions containing sodium hydroxide alone.

The foaming which was experienced previously in attempts to make sebacic acid from ricinoleates such as castor oil is chiefly overcome by adding the ricinoleate slowly to a caustic composition. In this way only a small quantity of unreacted ricinoleate is present in the reaction mixture at any particular time. Virtually, as rapidly as the soap is formed, it is decomposed and the capryl alcohol and other volatile matter is distilled off. Hydrogen which may be formed in the process easily comes off almost as quickly as evolved without being trapped in the reaction mixture to any great extent. In this way the objectionable foaming is avoided. The reaction will proceed at a suitable velocity if the flow of castor oil or other ricinoleate be adjusted at the highest rate at which no objectionable foaming occurs. In order to minimize foaming, it is also advisable to keep the temperature substantially constant and in this way to maintain a relatively uniform rate of reaction. If the reaction temperature drops to any great extent, the concentration of unreacted ricinoleate may rise rapidly and during a subsequent rise of temperature, the rate of reaction will be so rapid that excessive foaming will occur.

A relatively high boiling hydrocarbon oil which contains substantially no low boiling fractions may be added to the reaction mixture in order to assist further in preventing excessive foaming. This is merely optional since the foaming may be adequately controlled by suitably adjusting the inflow of ricinoleate and by maintaining the reaction temperature substantially constant at the desired point.

Within the preferred range of temperature for producing sebacic acid, capryl alcohol will normally be produced with little or no methyl hexyl ketone. If it be desirable to produce methyl hexyl ketone instead of capryl alcohol, the process preferably should be modified slightly. The volatile reaction products which are distilled off during the reaction are, after condensation, returned to the reaction mixture and in this way, capryl alcohol may be largely converted to methyl hexyl ketone. In general, it has been found that the ratio of methyl hexyl ketone to capryl alcohol increases with an increase of the time of contact of the volatile reaction products with the caustic.

If sebacic acid or one of its salts be desired in preference to omega-hydroxydecanoic acid, it may be desirable to introduce oxygen or air into the reaction chamber, especially if reaction temperatures near the lower part of the range be used.

Omega-hydroxydecanoic acid may be converted into sebacic acid by oxidation with well-known oxidizing agents such as potassium permanganate (in alkaline solution), potassium dichromate (in acidic solution), etc. Omega-hydroxydecanoic acid may also be converted into a salt of sebacic acid merely by heating in the presence of caustic alkali and a suitable flux in which the reactants and reaction products are soluble, e. g. water. The salt of sebacic acid may then be converted into the acid by treatment with a mineral acid.

Catalysts may be used in carrying out my process, but it has generally been found that good results may be obtained without any catalyst. However, if good yields of capryl alcohol be desired, it may be advisable to add a small quantity of a calcium salt to act as a catalyst.

While it is generally more convenient to operate at atmospheric pressure, it will be apparent that the process can be carried out at either reduced or increased pressures.

The following reactions are believed to take place in this process but it is to be understood that the invention is not restricted to this suggested explanation.

(1)
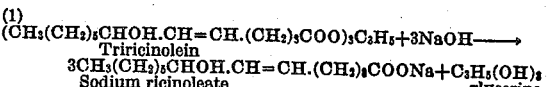

(2)
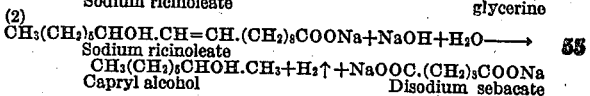

(3)

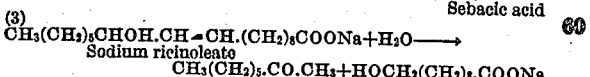

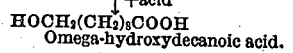

The conversion of ricinoleates into sebacic acid, salts of sebacic acid, capryl alcohol and/or methyl hexyl ketone is particularly described and claimed in my application Serial Number 255,177, filed February 8, 1939, and entitled "Production of organic compounds."

Obviously, many modifications of the process as described above are possible without departing from the spirit and scope of the invention as defined in the appended claims.

I claim:

1. A process in which a ricinoleic acid soap is converted into other organic compounds including a salt of omega-hydroxydecanoic acid, comprising heating a ricinoleic acid soap in the presence of water and an effective amount of caustic alkali at temperatures between 180° and 230° C.

2. In a process for converting castor oil into other organic compounds including a salt of omega-hydroxydecanoic acid, the step which comprises heating the castor oil in the presence of water and an effective amount of caustic alkali at a temperature between 180° and 230° C.

3. In a process for converting a ricinoleate into other organic compounds including a salt of omega-hydroxydecanoic acid, the steps which comprise heating an aqueous composition including an effective amount of caustic alkali at a temperature between 180° and 230° C. and maintaining the temperature substantially constant while adding a ricinoleate slowly to the composition.

4. In a process for converting a ricinoleate into other organic compounds including a salt of omega-hydroxydecanoic acid, the steps which comprise adding a ricinoleate slowly to an aqueous composition including an effective amount of caustic alkali to produce a reaction mixture, heating the reaction mixture at a temperature of between 180° and 230° C., removing at least one of the reaction products, and adding water to the reaction mixture to maintain the boiling point thereof substantially constant at a temperature between 180° and 230° C.

5. In a process for converting a ricinoleate into other organic compounds, the steps which comprise adding a ricinoleate slowly to an aqueous composition including an effective amount of caustic alkali to produce a reaction mixture, the reaction mixture being heated at a reaction temperature not over 400° C., removing at least one of the reaction products, and adding water to the reaction mixture to maintain the boiling point thereof substantially constant at a reaction temperature not over 400° C.

6. In a process for converting castor oil into other organic compounds, the steps which comprise adding castor oil slowly to an aqueous composition including an effective amount of caustic alkali to produce a reaction mixture, the reaction mixture being heated between 180° and 275° C., removing at least one of the reaction products, and adding water to the reaction mixture to maintain the boiling point thereof substantially constant at a temperature between 180° and 275° C.

7. In a process for converting a ricinoleate into other organic compounds, the steps which comprise heating an aqueous composition including an effective amount of caustic alkali at a temperature between 180° and 275° C., adding a ricinoleate slowly to the composition to produce a reaction mixture and adding water to the reaction mixture to maintain the boiling point thereof substantially constant at a temperature between 180° and 275° C.

8. A process for converting a ricinoleate into other organic compounds including omega-hydroxydecanoic acid which comprises adding a ricinoleate slowly to an aqueous composition including an effective amount of caustic alkali to produce a reaction mixture, the reaction mixture being heated between 180° and 230° C., removing at least one of the reaction products, adding water to the reaction mixture to maintain the boiling point thereof substantially constant at a temperature between 180° and 230° C., and recovering omega-hydroxydecanoic acid from the reaction mixture.

9. In a process for converting castor oil into other organic compounds including a salt of omega-hydroxydecanoic acid, the steps which comprise adding castor oil slowly to an aqueous composition including an effective amount of caustic alkali to produce a reaction mixture, the reaction mixture being heated at about 190° C., removing water and at least one of the reaction products by distillation, and adding water to the reaction mixture to maintain the boiling point thereof substantially constant at about 190° C.

10. A process for converting castor oil into other organic compounds which comprises heating an aqueous composition including an effective amount of caustic alkali at reaction temperature, adding castor oil slowly to the composition to produce a reaction mixture, removing non-acidic reaction products, adding water to the reaction mixture to maintain the boiling point thereof substantially constant at reaction temperature, and separating the non-acidic reaction products.

11. A process for converting a ricinoleate into other organic compounds including methyl hexyl ketone which comprises heating an aqueous composition including an effective amount of caustic alkali to maintain a temperature between 180° and 230° C., adding a ricinoleate slowly to the composition to produce a reaction mixture, removing the volatile reaction products, adding water to the reaction mixture to maintain the boiling point thereof substantially constant at a temperature between 180° and 230° C., and separating methyl hexyl ketone from said volatile reaction products.

12. A process of converting castor oil into other organic compounds including omega-hydroxydecanoic acid which comprises adding castor oil slowly to an aqueous composition including an effective amount of caustic alkali to produce a reaction mixture, heating the reaction mixture at about 190° C., removing volatile reaction products, adding water to the reaction mixture to maintain the boiling point thereof substantially constant at about 190° C., mixing the non-volatile residue of the reaction mixture with a relatively large volume of warm water, agitating the mixture of the residue and the warm water, acidifying the mixture with a mineral acid until the pH is about 6.7, allowing said mixture to separate into two layers, removing the aqueous layer, mixing the said aqueous layer with a filter aid, filtering said aqueous layer while warm, adding sufficient mineral acid to the filtrate with agitation until the pH is about 1.5, cooling the filtrate, thereby precipitating omega-hydroxydecanoic acid, and separating the omega-hydroxydecanoic acid from the filtrate.

ALFRED GORDON HOUPT.

CERTIFICATE OF CORRECTION.

Patent No. 2,217,515.   October 8, 1940.

ALFRED GORDON HOUPT.

It is hereby certified that error appears in the printed specification of the above numbered patent requiring correction as follows: Page 2, second column, line 69, for "F." read --C.--; and that the said Letters Patent should be read with this correction therein that the same may conform to the record of the case in the Patent Office.

Signed and sealed this 5th day of November, A. D. 1940.

(Seal)

Henry Van Arsdale,
Acting Commissioner of Patents.